US007722229B2

(12) United States Patent
Chang

(10) Patent No.: US 7,722,229 B2
(45) Date of Patent: May 25, 2010

(54) FRAME DESIGN AND BACKLIGHT SYSTEM USING THE SAME

(75) Inventor: Shao-Han Chang, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 378 days.

(21) Appl. No.: 11/501,940

(22) Filed: Aug. 10, 2006

(65) Prior Publication Data

US 2007/0103915 A1 May 10, 2007

(30) Foreign Application Priority Data

Nov. 4, 2005 (CN) ........................ 2005 1 0101018

(51) Int. Cl.
*F21V 21/00* (2006.01)

(52) U.S. Cl. ........................ 362/374; 362/362; 362/633; 362/632; 362/375; 362/368; 362/97.1; 362/634; 349/58; 349/60

(58) Field of Classification Search ................. 362/374, 362/362, 633, 632, 634, 375, 368, 97.1
See application file for complete search history.

(56) References Cited

U.S. PATENT DOCUMENTS 3,215,327 A * 11/1965 Crabtree .................. 206/521.1
6,068,381 A * 5/2000 Ayres ......................... 362/633
6,559,908 B2 * 5/2003 Hiratsuka et al. ............. 349/58
2004/0062027 A1 * 4/2004 Kim et al. ...................... 362/31
2004/0252514 A1 * 12/2004 Okabe et al. ................ 362/362
2006/0118684 A1 * 6/2006 Wu et al. ............... 248/225.11
2007/0002554 A1 * 1/2007 Lim ............................ 362/97

* cited by examiner

*Primary Examiner*—Sandra L O'Shea
*Assistant Examiner*—Jessica L McMillan
(74) *Attorney, Agent, or Firm*—Clifford O. Chi

(57) ABSTRACT

A frame includes a main frame and a receiving frame. The main frame includes a base and several circumferential sidewalls extending from the base. At least two opposite stepped elements are defined at the top of two opposite sidewalls. Each stepped element includes a tread portion extending from the sidewall toward an inner of the main frame, a riser portion extending from the end of the tread portion toward the opening. The receiving frame includes a frame body, a rim portion extending from a bottom of the frame body toward an inner of the frame body, and at least two grooves defined in the rim portion corresponding to the two stepped elements. Each groove of the receiving frame may be inserted into the corresponding stepped element. A backlight system using the frame is also provided, which has a narrow-framed, space-saving design, and also can be assembled easily.

19 Claims, 8 Drawing Sheets

FRAME DESIGN AND BACKLIGHT SYSTEM USING THE SAME

TECHNICAL FIELD

The present invention relates to a frame design, and backlight system using the same, more particularly, to a bottom-lighting type backlight system for use in, for example, a liquid crystal display (LCD).

BACKGROUND

In a liquid crystal display device, a liquid crystal is a substance that does not itself illuminate light. Instead, the liquid crystal relies on light received from a light source, thereby displaying images and data. In the case of a typical liquid crystal display, a backlight system powered by electricity supplies the needed light.

Typically, the bottom-lighting type backlight system includes a plurality of light sources, a number of optical sheets, and a frame fixing the light sources and accommodating the optical sheets. The optical sheets can be selected from a group consisting of a diffusing plate, a prism sheet, or a brightness enhancement film. The optical sheets are used to improve the backlight system's optical uniformity.

Referring to FIGS. 10 through 12, a typical frame 10 for use in bottom-lighting type backlight system with an optical sheet 16 is shown. The frame 10 includes a metal main frame 12 and a receiving frame 14. The main frame 12 is a rectangular housing, which includes a base 122 and a circumferential sidewall 124 extending from the base 122 to define an opening (not labeled). The main frame 12 is usually manufactured by being punched out from a metal sheet. A plurality of positioning pins 126 is disposed on the top the sidewalls 124. The receiving frame 14 has a frame body (not labeled) defining a rectangular opening (not labeled) therein, and a plurality of pinholes 146 disposed on the frame body corresponding to the positioning pins 124. The receiving frame 14 can be mounted onto the top of the main frame 12 by inserting the positioning pins 124 in the corresponding pinholes 146, so that the lengths of the frame body should be configured to match with that of the main frame 12.

In order to accommodate the optical sheet 16, widths of two opposite frame body of the receiving frame 14 is configured to be larger than that of the corresponding sidewalls 124 of the main frame 12. The optical sheet 16 also defines a plurality of pinholes 166 thereon corresponding to the positioning pins 126, thus, the optical sheets 16 can be fixed onto the receiving frame by inserting the positioning pins 126 through the corresponding pinholes 146 and 166.

However, the process of assembling the frame 10 and fixing the optical sheet 16 on the receiving frame 14 is complicated, because it is needed to respectively insert the positioning pins 126 through the pinholes 146 of the receiving frame 14, and also through the pinholes 166 of the optical frame 16. In addition, in order to configure a plurality of positioning pins 126 or pinholes 146 on the top of the sidewalls 124 of the main frame 12 and the receiving frame 14, the main frame 12 and the receiving frame 14 requires more setup space, thus, widths of sidewalls 124 of the main frame 12 and the receiving frame 14 is large.

What is needed, therefore, is a frame, and backlight system using the same that has a narrow-framed, space-saving design, such that it can be assembled easily.

SUMMARY

A frame for use in backlight system according to a preferred embodiment includes a main frame and a receiving frame. The main frame includes a base and a circumferential sidewall extending from the base to define an opening. At least two opposite stepped elements are respectively defined at a top of the two opposite sidewalls, and each stepped element includes a tread portion extending from the sidewall toward an inner of the main frame, a riser portion extending from the end of the tread portion away from the base. The receiving frame includes a frame body, a rim portion extending from a bottom of the frame body toward an inner of the frame body, and at least two grooves defined in the rim portion corresponding to the two stepped elements. Each groove of the receiving frame may be inserted into the corresponding stepped element of the main frame, thereby the receiving frame is supported by the tread portion of the stepped element of the main frame.

A backlight system according to a preferred embodiment includes a main frame, a receiving frame, at least one optical sheet and a plurality of light sources. The same main frame and receiving frame as described in the previous paragraph are employed in this embodiment. The optical sheet is accommodated on rim portion of the receiving frame. The light sources are regularly arranged in the main frame under the optical sheet.

Other advantages and novel features will become more apparent from the following detailed description of the preferred embodiments, when taken in conjunction with the accompanying drawings.

BRIEF DESCRIPTION OF THE DRAWINGS

Many aspects of the frame and the related backlight system having the same can be better understood with reference to the following drawings. The components in the drawings are not necessarily drawn to scale, the emphasis instead being placed upon clearly illustrating the principles of the present frame and the related backlight system. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present frame and backlight system using the same, in detail.

Figure 1:
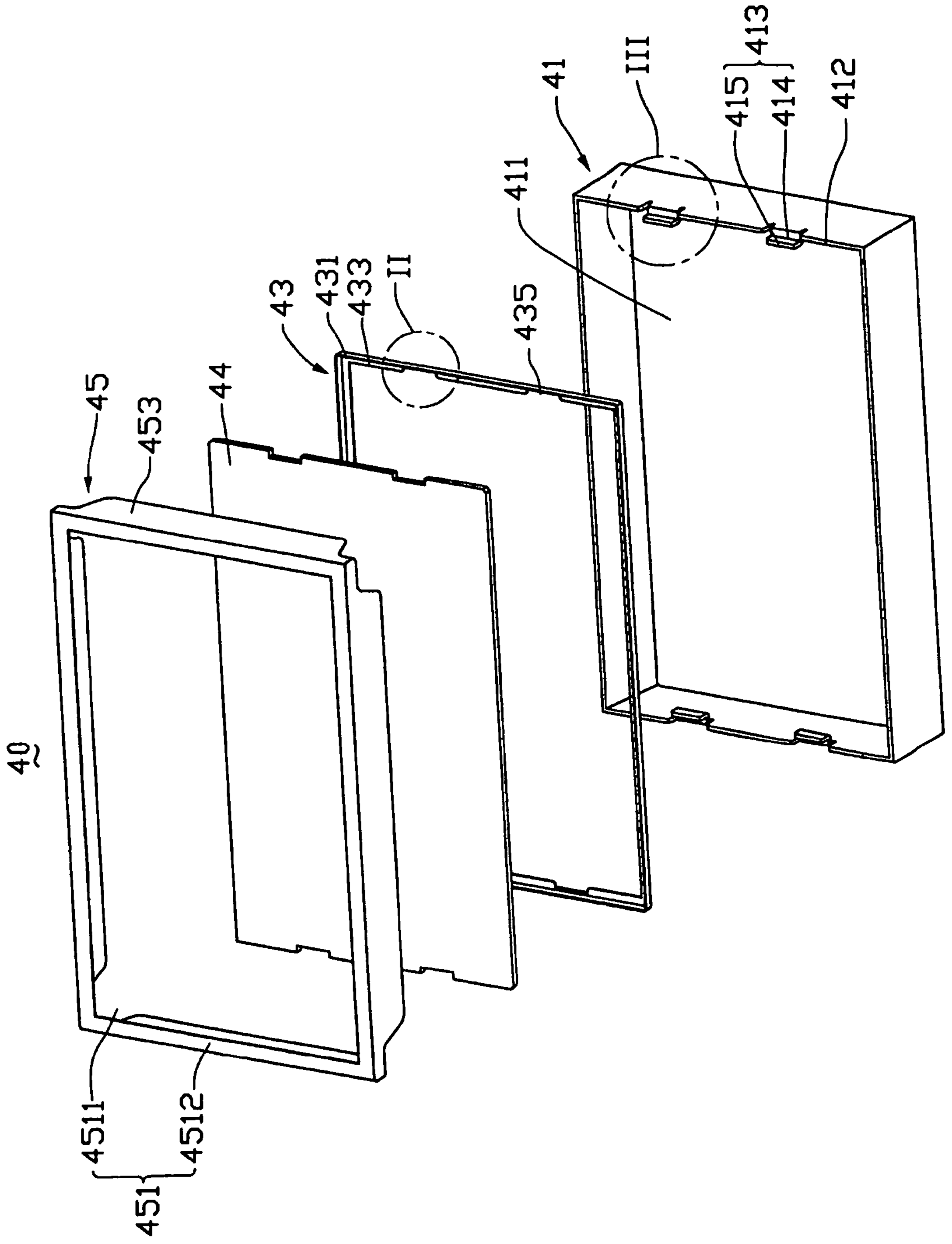
FIG. 1 is a schematic, exploded perspective view of a frame with a optical sheet according to a first preferred embodiment.
Figure 2:
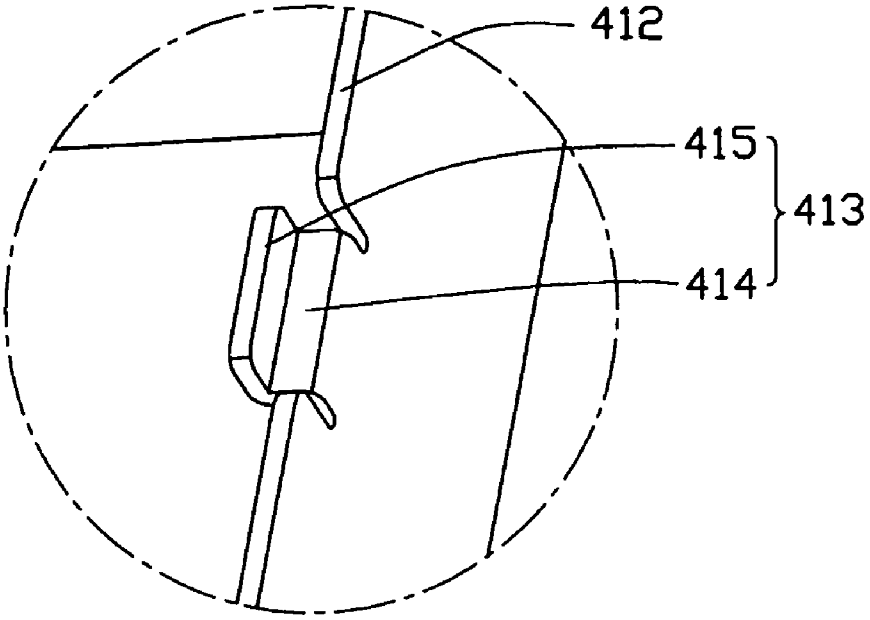
FIG. 2 is an enlarged view of a circled portion II of FIG. 1.
Figure 3:
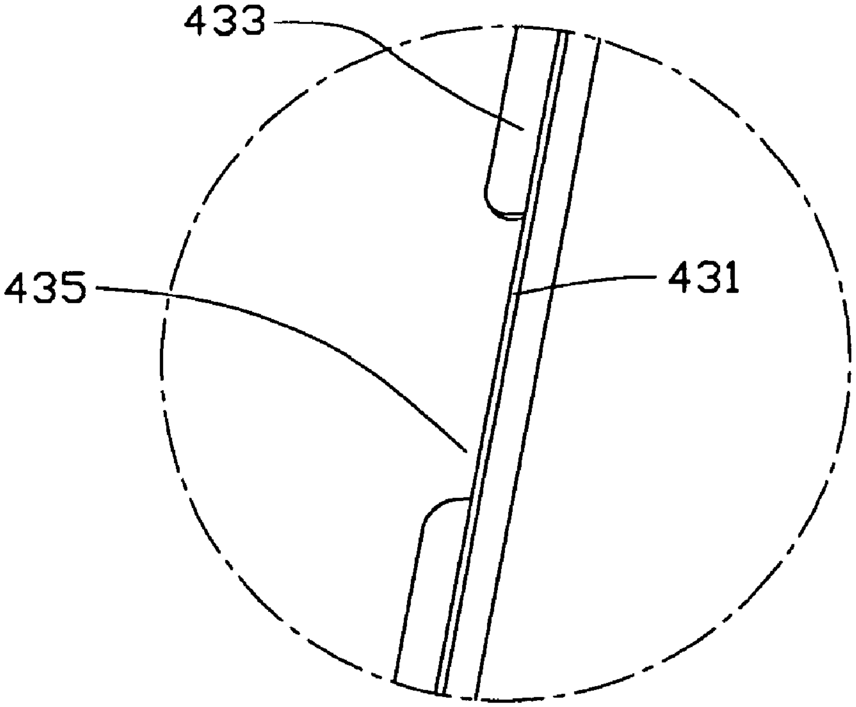
FIG. 3 is an enlarged view of a circled portion III of FIG. 1.
Figure 4:
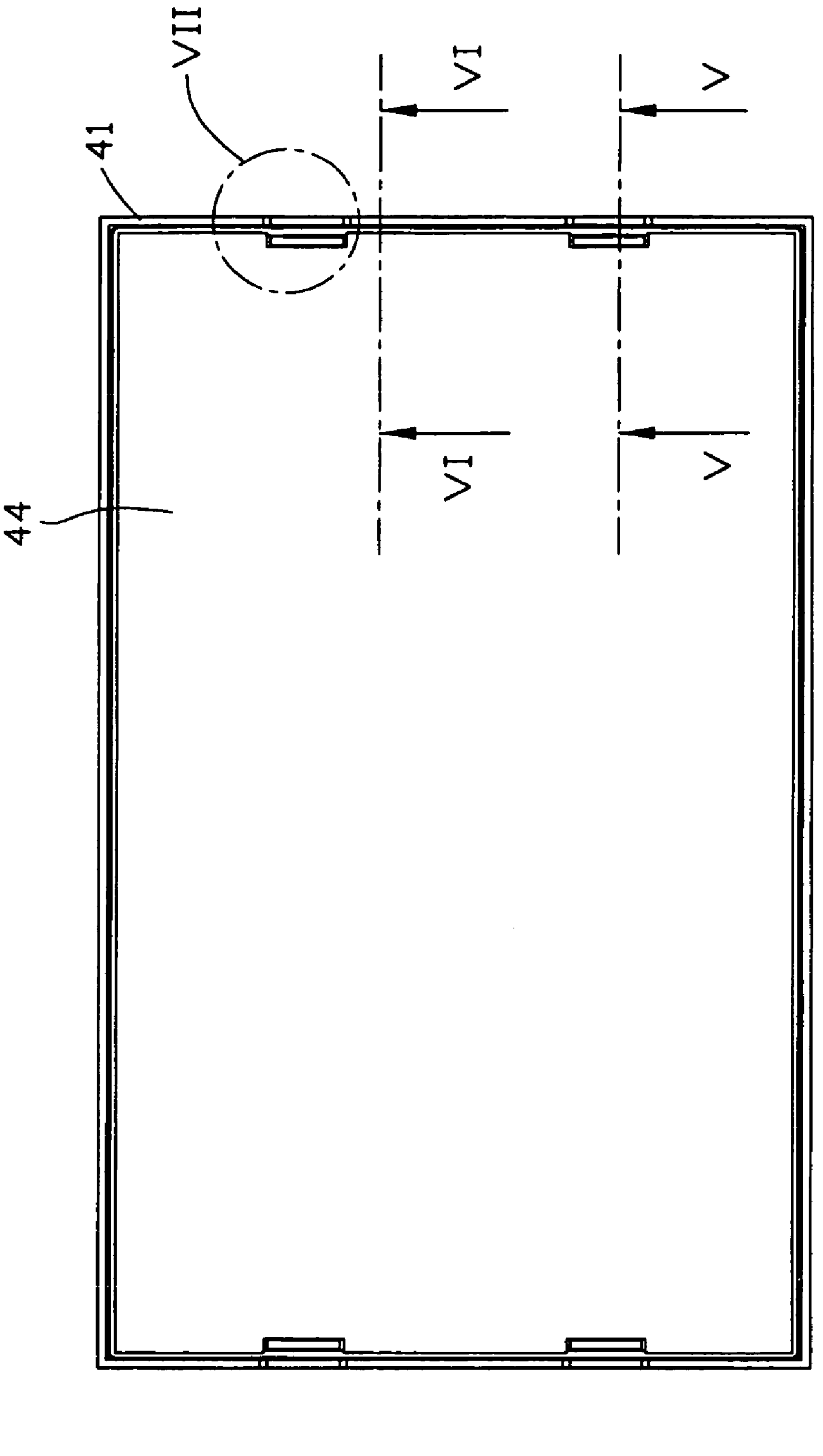
FIG. 4 is a schematic, assembled top plan view of a frame fixing the optical sheet without an upper frame of FIG. 1.
Figure 5:
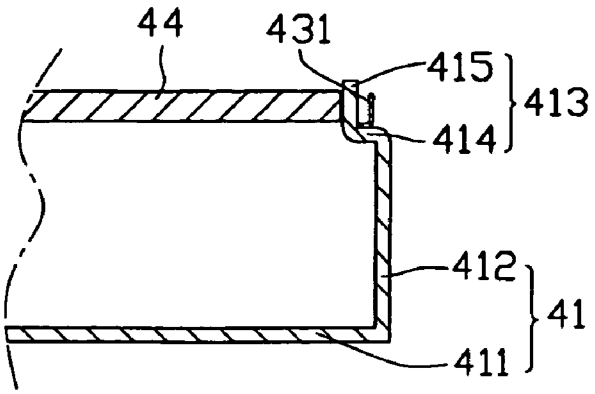
FIG. 5 is a schematic, cross-sectional view taken along a V-V line of FIG. 4.
Figure 6:
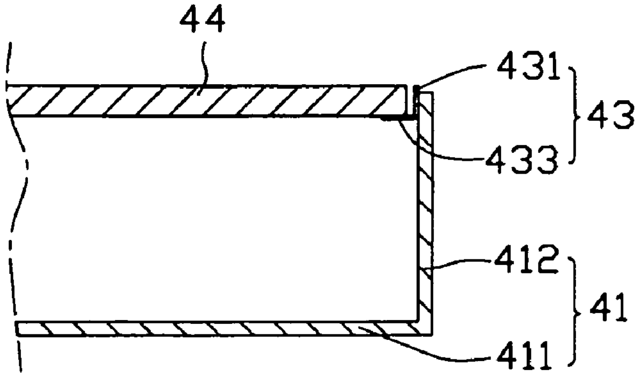
FIG. 6 is a schematic, cross-sectional view taken along a VI-VI line of FIG. 4.
Figure 7:
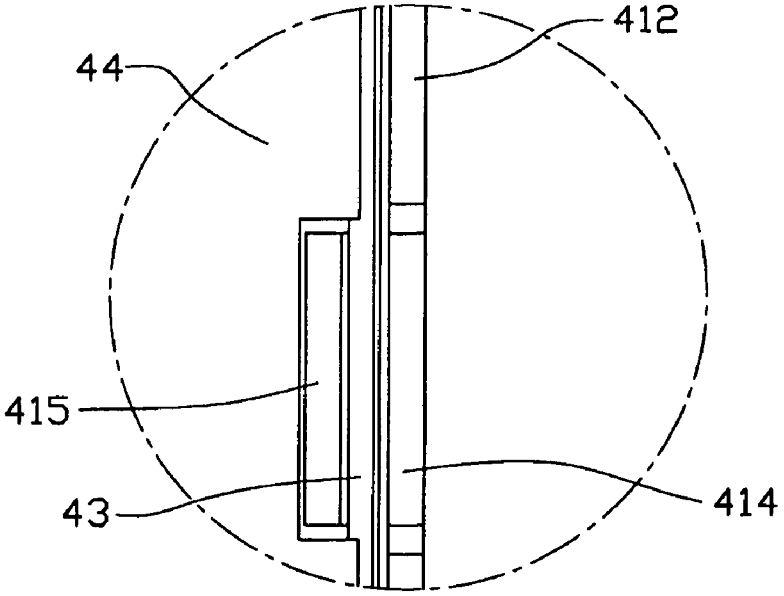
FIG. 7 is an enlarged view of a circled portion VII of FIG. 4.

Referring to FIGS. 1 through 3, a frame 40 in accordance with a first preferred embodiment is shown. The frame 40 includes a main frame 41 and a receiving frame 43. The main frame 41 includes a base 411 and four sidewalls 412 extending from the peripheral of the base 411 to define an opening (not labeled). A shape of the base 411 is rectangular. Two opposite sidewalls 412 respectively define two stepped elements 413 in the top area thereof. Each stepped element 413 includes a tread portion 414 extending from the sidewall 412 towards an inner area of the main frame 41, a riser portion 415 extending from the end of the tread portion 414 away from the base. The tread portion 414 is positioned below the top of the sidewalls 412, and a peak of the riser portion 415 extends beyond the sidewalls 412.

The receiving frame 43 includes a frame body 431, a rim portion 433 extending from a bottom of the frame body 431 running perpendicularly around an inside of the receiving frame 43. At least two grooves 435 are cut out in the rim portion 433 corresponding to the two stepped elements 413. A length of sidewall of the frame body 431 is respectively and appreciably smaller than that of the corresponding sidewall 412, thereby the receiving frame 43 can be fixed to the inner side of the main frame 41.

The process of assembling the frame 40 is simple. When the receiving frame 43 is pressed into the main frame 41, each groove 435 of the receiving frame 43 is inserted into the corresponding stepped element 413 of the main frame 41. Referring to FIGS. 4 through 7, the tread portion 414 of the stepped element 413 supports the receiving frame 43. A width of the tread portion 414 that extends from the sidewall 412 to the riser portion 415 is approximately equal to the width of the frame body 431 of the receiving frame 43. Therefore, the riser portion 415 of the stepped element 413 not only restricts the receiving frame 43 to vibrate along a horizontal direction, but also to fix the receiving frame 43 to the inner side of the main frame 41 tightly. The rim portion 433 of the receiving frame 43 is used to receive an optical sheet 44 thereon.

Compared with frame 10, frame 40 does not need to configure a plurality of positioning pins or pinholes on the top of the sidewalls of the main frame and the receiving frame, thus, frame 40 requires less setup space. The present frame 40 has a narrow-framed, space-saving design, due to the sidewalls of the main frame 41 are configured to be significantly thin, and the widths of stepped elements 413 are also configured to be small enough to tightly fix the receiving frame 43.

Figure 8:
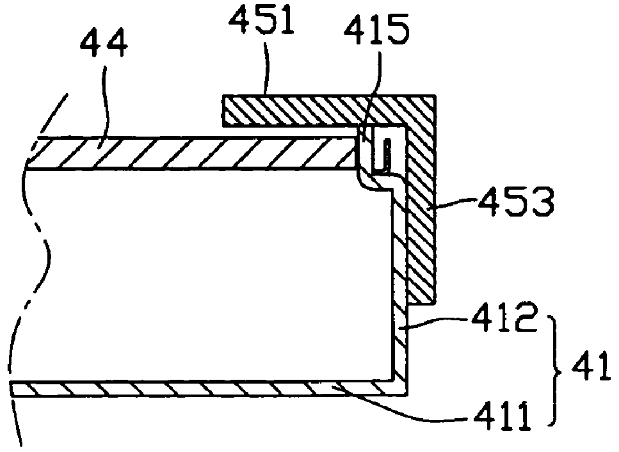
FIG. 8 is a schematic, partially assembled cross-sectional view of the frame of FIG. 1.

Also referring to FIGS. 1 and 8, a frame 60 in accordance with the first preferred embodiment may further include an upper frame 45 for fixing an optical sheet 44 tightly. The upper frame 45 includes an upper base 451 and four sidewalls 453 extending perpendicularly from the upper base 451. The upper base 451 defines an opening 4511 in the interior thereof and forms four frame edges 4512. The optical sheet 44 is exposed through the opening 4511 of the upper base 451. In order to hide the riser portion 415, widths of the frame edges 4512 are configured to be approximately larger than a distance from the sidewalls 412 and to the riser portion 415. The sidewalls 453 of the upper frame 45 and the sidewall 412 of the main frame 41 respectively define a plurality of locking elements (not shown) thereon.

In this embodiment, each locking element includes a receiving hole disposed on the sidewalls 453 of the upper frame 45 and a fastener disposed on the sidewalls 412 of the main frame 41 according to the receiving hole. The fastener can be locked into the receiving hole, thereby the upper frame 45 is fixed onto the main frame 41 tightly. It is noted that positions of the fastener and the receiving hole are interchangeable. In an alternative embodiment, the locking element may also employ screws for fixing the upper frame 45 to the main frame 41. The sidewalls 453 of upper frame 45 and the sidewalls 412 of the main frame 41 also define a plurality of corresponding screw holes therein for receiving the screws. The upper frame 45 is directly combined with the outer surfaces of the sidewalls 412 of the main frame 41 by the screws.

When the upper frame 45 is combined with the main frame 41, the riser portion 415 supports the frame edges 4512 of the upper frame 45, thereby the receiving frame 43 is retained between the upper frame 45 and the main frame 41. Since the optical sheet 44 is received on the rim portion 433 of the receiving frame 43, the optical sheet 44 may be enclosed between the upper frame 45 and the receiving frame 43. The height of the riser portion 415 may be controlled to define a suitable gap (not labeled) between the upper frame 45 and the optical sheet 44, so as to decrease the risk of the optical sheet 44 from being damaged by any unconventional pressing forces from the upper frame 45.

In this embodiment, the main frame 41, the receiving frame 43 and the upper frame 45 are all formed of metal, especially since metals have good heat dissipation capability and low density. It is noted that the present main frame can also be configured to have only two stepped elements respectively disposed on two opposite sidewalls thereof. The base of the present main frame can also be configured in to be circular or any irregular polygon shapes, if necessarily. It is also noted that the present main frame can be configured to have only one stepped element disposed on one sidewalls thereof, and further includes at least a protruding portion extending from the opposite sidewall toward the inner area of the main frame, cooperating with the stepped element so as to support the receiving frame.

Figure 9:
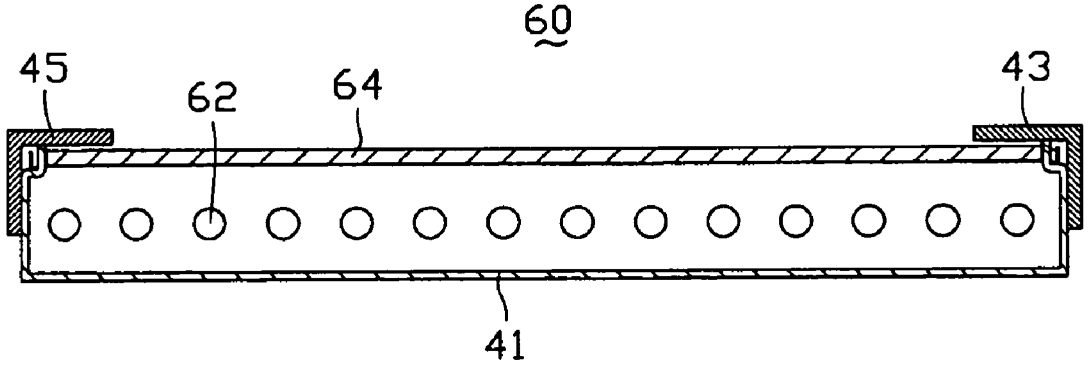
FIG. 9 is a schematic, cross-sectional view of a backlight system according to a second preferred embodiment.
Figure 10:
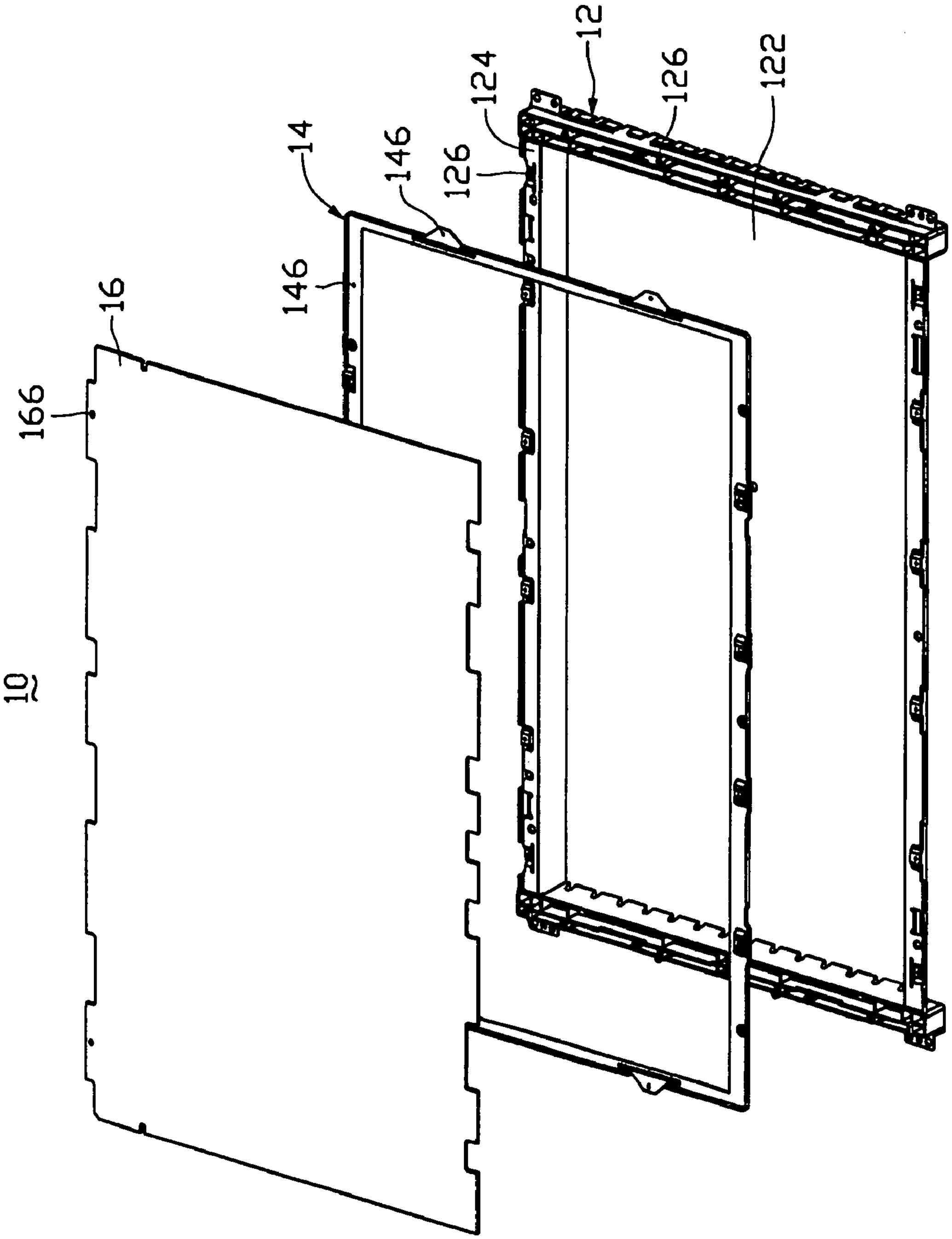
FIG. 10 is a schematic, exploded perspective view of a conventional frame with an optical sheet.
Figure 11:
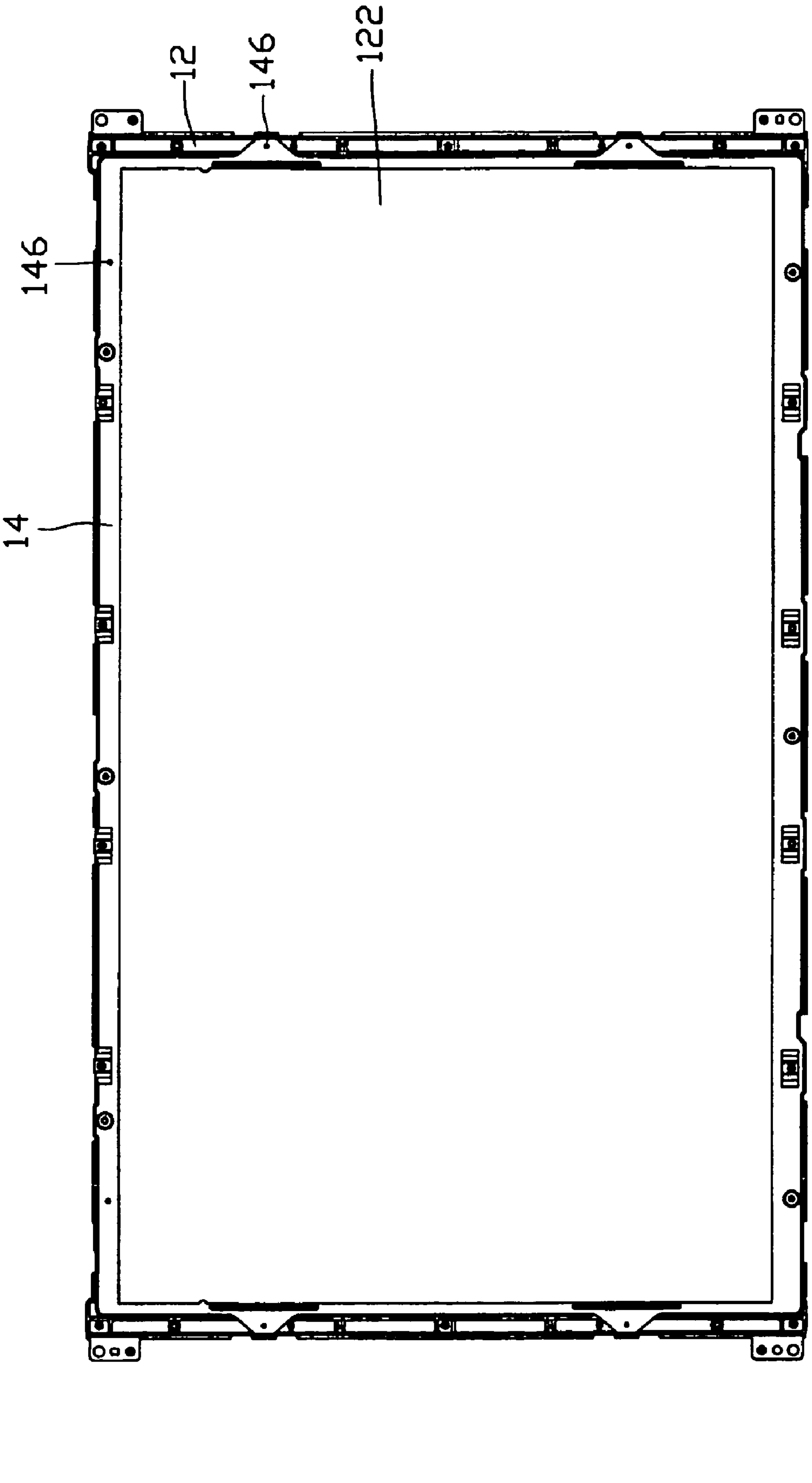
FIG. 11 is a schematic, top plan view of the frame after being assembled of FIG. 10.
Figure 12:
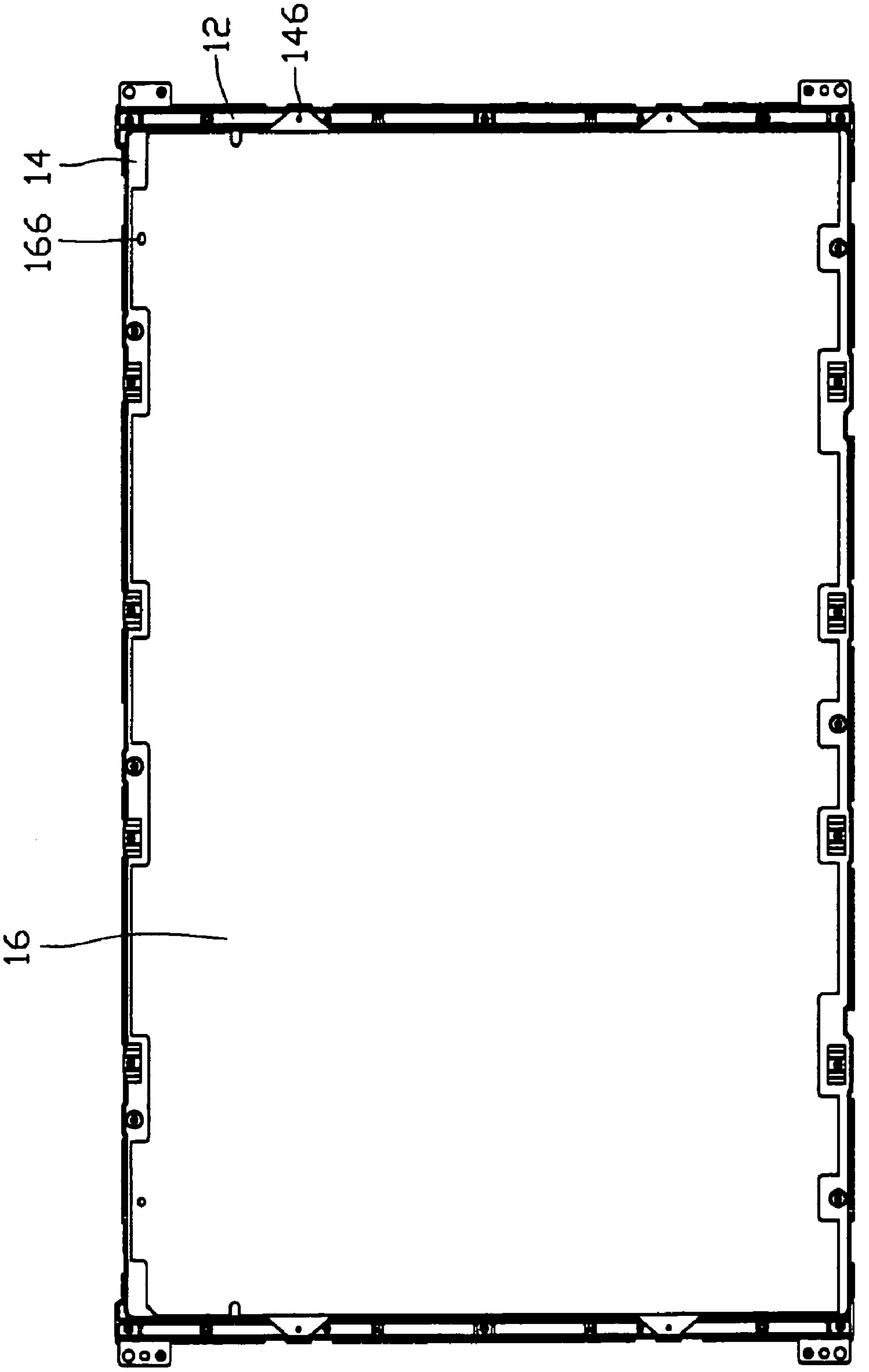
FIG. 12 is a schematic, top plan view of the frame after fixing the optical sheet of FIG. 10.

Referring to FIG. 9, a backlight system 60 in accordance with a second preferred embodiment is shown. The backlight system 60 includes the main frame 41, the receiving frame 43, at least one optical sheet 64 and a plurality of light sources 62. The main frame 41 and the receiving frame 43 as described in the previous paragraphs are employed in this embodiment. The optical sheet 64 is received on the rim portion (not shown) of the receiving frame 43. The light sources 62 are regularly arranged on the main frame 41 under the optical sheet 64. The backlight system 60 may further include the upper frame 45 that can be combined with the main frame 41 by a plurality of locking elements (not shown). The optical sheet 64 is enclosed between the upper frame 45 and the receiving frame 43.

The light sources 62 may be selected from a group consisting of cold cathode fluorescent lamp and light emitting diode. The optical sheet 64 may be selected from a group consisting of a diffusing plate, a prism plate, a polarize plate, a brightness enhancement film or a combination thereof. Light emitted from the light sources 62 can be uniformly illuminated onto a liquid crystal display panel (not shown) through the optical sheet 64.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A frame of a backlight module, the frame comprising:

a main frame having a base and a plurality of sidewalls extending from the peripheral of the base to define an opening, wherein at least one stepped element is formed at a top of one sidewall, the at least one stepped element includes a tread portion extending from the sidewall toward an inner area of the main frame, a riser portion extending relatively perpendicular from the end of the tread portion away from the base; and a receiving frame having a frame body, a rim portion extending from a bottom of the frame body toward an inner area of the frame body, and at least one groove defined in the rim portion corresponding to the stepped element;

wherein the corresponding stepped element inserts into the groove of the receiving frame, with the frame body of the receiving frame positioned between the riser portion of the at least one stepped element and the sidewalls of the main frame, such that the tread portion of the at least one stepped element supports the receiving frame.

2. The frame according to claim 1, wherein the number of the stepped elements is two with each formed at a top of one of two opposite sidewalls.

3. The frame according to claim 1, wherein the main frame comprises one stepped element defined at a top of one sidewall, and further comprises a protruding portion extending from the opposite sidewall toward the inner area of the main frame, cooperating with the stepped element so as to support the receiving frame.

4. The frame according to claim 1, wherein the tread portion is positioned below the top of the sidewall.

5. The frame according to claim 1, wherein a peak of the riser portion extends beyond the sidewalls.

6. The frame according to claim 1, further comprising an upper frame disposed on the receiving frame, wherein the upper frame includes an upper base and a plurality of edge sidewalls extending from the upper base, wherein the upper base defines an opening in the interior thereof and forms a plurality of frame edges that is supported by the riser portion of the main frame.

7. The frame according to claim 6, wherein widths of the frame edges are approximately larger than a distance from the sidewalls of the main frame to the riser portion, so as to hide the stepped elements.

8. The frame according to claim 6, wherein the upper frame, the main frame, and the receiving frame are all formed with metal.

9. The frame according to claim 6, wherein the upper frame and the main frame are combined with each other by a plurality of locking elements defined on the sidewalls of upper frame and the sidewalls of the main frame.

10. The frame according to claim 9, wherein each locking element comprises a receiving hole disposed in one of the sidewalls of the upper frame and the main frame, a fastener disposed on the other one of the sidewalls of the upper frame and the main frame corresponding to the receiving hole, such that the fastener may be locked into the receiving hole.

11. The frame according to claim 9, wherein each locking element comprises a screw and a screw hole respectively defined in the sidewalls of the upper frame and the main frame for receiving the screw.

12. A backlight system comprising:

a main frame having a base and a sidewall extending from the base to define an opening, wherein at least one stepped element is defined at a top of one sidewall, the at least one stepped element includes a tread portion extending from the sidewall towards an inner area of the main frame, a riser portion extending somewhat perpendicularly from the end of the tread portion away from the base;

a receiving frame having a frame body, a rim portion extending from a bottom of the frame body along an inner area of the frame body, and at least one groove defined in the rim portion corresponding to the stepped elements, wherein the corresponding stepped element inserts into the groove of the receiving frame, with the frame body of the receiving frame positioned between the riser portion of the at least one stepped element and the sidewalls of the main frame, such that the tread portion of the at least one stepped element supports the receiving frame;

at least an optical sheet positioned on the rim portion of the receiving frame; and a plurality of light sources arranged in the main frame under the optical sheet, the light sources being configured for illuminating the optical sheet.

13. The backlight system according to claim 12, wherein the main frame comprises at least two stepped elements respectively defined at a top area of two opposite sidewalls.

14. The backlight system according to claim 12, wherein the main frame comprises one stepped element defined at a top of one sidewall, and further comprises a protruding portion extending from the opposite sidewall toward the inner area of the main frame, cooperating with the stepped element so as to support the receiving frame.

15. The backlight system according to claim 12, wherein the light source comprises a cold cathode fluorescent lamp and a light emitting diode.

16. The backlight system according to claim 12, wherein the optical sheet may be selected from a group consisting of a diffusing plate, a prism plate, a polarize plate, a brightness enhancement film or a combination thereof

17. The backlight system according to claim 12, wherein the tread portion is positioned below the top of the sidewalls.

18. The backlight system according to claim 12, wherein a peak of the riser portion extends to a height higher than that of the sidewalls.

19. The backlight system according to claim 12, further comprising an upper frame disposed on the receiving frame, the upper frame including an upper base and a plurality of edge sidewalls extending from the upper base, the upper base defining an opening in the interior thereof and forming a plurality of frame edges that is supported by the riser portion of the main frame.

* * * * *